United States Patent
Oka et al.

(10) Patent No.: US 6,846,868 B2
(45) Date of Patent: Jan. 25, 2005

(54) POLYAMIDE COMPOSITION

(75) Inventors: Hideaki Oka, Tsukuba (JP); Tetsuya Hara, Kurashiki (JP); Shigeru Sasaki, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 133 days.

(21) Appl. No.: 10/161,686

(22) Filed: Jun. 5, 2002

(65) Prior Publication Data

US 2003/0050376 A1 Mar. 13, 2003

(30) Foreign Application Priority Data

Jun. 5, 2001 (JP) ........................................ 2001-169159

(51) Int. Cl.$^7$ ............................. C08K 3/10; C08K 3/34; C08G 73/10
(52) U.S. Cl. ........................ 524/413; 524/443; 528/322; 528/335; 528/340; 528/347; 528/348
(58) Field of Search ................................. 524/413, 443; 528/322, 335, 340, 347, 348

(56) References Cited

U.S. PATENT DOCUMENTS

| | | |
|---|---|---|
| 3,457,325 A | 7/1969 | Anton et al. |
| 3,639,335 A | 2/1972 | Fujii et al. |
| 4,172,194 A | 10/1979 | Scoggins et al. |
| 4,937,276 A | 6/1990 | Nielinger et al. |
| 4,963,646 A | 10/1990 | Galland et al. |
| 5,003,009 A | 3/1991 | Matthies et al. |
| 5,081,222 A | 1/1992 | Reimann et al. |
| 5,109,106 A | 4/1992 | Lahary et al. |
| 5,322,923 A | 6/1994 | Lahary et al. |
| 5,670,608 A | 9/1997 | Oka et al. |
| 5,763,561 A | 6/1998 | Keske |
| 6,156,869 A | 12/2000 | Tamura et al. |
| 6,258,927 B1 | 7/2001 | Oka et al. |
| 6,414,064 B1 | 7/2002 | Matsuoka et al. |
| 6,552,123 B1 * | 4/2003 | Takayashi et al. ............ 525/57 |

FOREIGN PATENT DOCUMENTS

| | | |
|---|---|---|
| EP | 0 285 692 | 10/1988 |
| EP | 0 327 979 | 8/1989 |
| EP | 0 659 799 | 6/1995 |
| JP | 5-117525 | 5/1993 |
| JP | 5-140386 | 6/1993 |
| JP | 7-126516 | 5/1995 |
| JP | 7-228768 | 8/1995 |
| JP | 7-228773 | 8/1995 |
| JP | 9-316731 | 12/1997 |
| JP | 2001-11308 | 1/2001 |
| WO | WO 92/10525 | 6/1992 |
| WO | WO 00/78869 | 12/2000 |

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

A polyamide composition comprising 100 parts by weight of (A) a semiaromatic polyamide having dicarboxylic acid units mainly composed of aromatic dicarboxylic acid units and diamine units mainly composed of aliphatic diamine units having 4 to 14 carbon atoms and containing not more than 15 $\mu$eq/g of terminal amino groups; and 0.01 to 5 parts by weight of (B) a copper compound.

20 Claims, No Drawings

POLYAMIDE COMPOSITION

BACKGROUND OF THE INVENTION

1. Field of the Invention

The present invention relates to a polyamide composition. The polyamide compositions of the present invention have excellent heat aging characteristics, as well as excellent mechanical characteristics, low-water-absorption properties and dimensional stability. The polyamide compositions of the present invention can be used as molding materials for industrial materials or the manufacture of household goods. The polyamide compositions of the present invention are, especially, suited for various articles, which is used at a high temperature, such as engine room parts of an automobile.

2. Description of the Background

Crystalline polyamides represented by nylon 6 and nylon 66 have been used widely in the manufacture of fibers for clothing and as industrial materials. The crystalline polyamides have also been used as general-purpose engineering plastics, because they have excellent thermal properties, physical properties and rigidity with good balance. Such general-purpose aliphatic polyamides exhibit undesirable properties such as insufficient heat resistance and poor dimensional stability because they absorb water. Particularly in recent years, polyamides which are intended for use in the fields of electrical and electronic parts, automobile parts, and fibers are required to have excellent heat aging characteristics.

In order to meet the above requirements, one approach has been to provide polyamide compositions comprising an aliphatic polyamide and a stabilizer such as (i) a copper salt, which is derived from the reaction of a copper halide and xylenediamine (U.S. Pat. No. 3,639,335), (ii) a copper phthalate and an alkali metal iodide (U.S. Pat. No. 3,457,325) or (iii) a mixture of copper, halogen- and phosphorus-containing compounds (U.S. Pat. No. 4,937,276).

Another approach to the problem is the preparation of polyamide compositions which comprise a semi-aromatic polyamide. The heat resistance of these polyamide compositions is generally better than that of an aliphatic golyamide, and the incorporation of a copper compound as a stabilizer into the compositions has also been proposed. U.S. Pat. No. 5,003,009 discloses impact resistant nylon molding materials containing (A) a linear, thermoplastic nylon composed of radicals derived from terephthalic acid, isophthalic acid and alkanediamines of 4 to 10 carbon atoms, and (B) one or more copolymers of (i) ethylene, an ester of (meth)acrylic acid and a monomer having an acidic functional group or a latent acidic functional group, or (ii) an ester of (meth)acrylic acid, a monomer having an acidic functional group or a latent acidic functional group and a monomer having 2 or more olefinic double bonds, and, if required, (c) effective amount of additives such as antioxidants and stabilizers, e.g. copper (I) halides. Japanese Patent Application Laid-open No. Hei 7-228768, (JPA 228768/95) discloses a polyamide composition comprising (a) a semiaromatic polyamide having (i) terephthalic acid units and 1,9-nonanediamine units or (ii) terephthalic acid units, 1,9-nonanediamine units and 2-methyl-1,8-octanediamine units, and having an intrinsic viscosity [η] measured in concentrated sulfuric acid at 30° C. of 0.4 to 3.0 dl/g, (b) a copper compound, (c) an alkali metal halide and (d) an organic stabilizer. Japanese Patent Application Laid-open No. Hei 7-228773 (JPA 228773/95) discloses a polyamide composition comprising (a) a semi-aromatic polyamide having (i) terephthalic acid units and 1,9-nonanediamine units or (ii) terephthalic acid units, 1,9-nonanediamine units and 2-methyl-1,8-octanediamine units, and having an intrinsic viscosity [η] measured in concentrated sulfuric acid at 30° C. of 0.4 to 3.0 dl/g, (b) a copper compound and (c) a nucleating agent. U.S. Pat. No. 5,763,561 discloses an injection moldable composition comprising (a) a semiaromatic polyamide containing about 0 to about 40 μeq/g of carboxylic acid end groups, said polyamide containing aliphatic diamine units of 4 to 14 carbon atoms and terephthalic acid units; and (b) a copper-containing thermal stabilizer formulation comprising an alkali metal halide and a copper (I) halide in a weight ratio ranging from about 2.5:1 to about 20:1.

However, the present inventors have found that it is desired to improve the heat aging characteristics of the known polyamide compositions such as described above in order to meet the requirement of the excellent heat aging characteristics which are needed for, e.g., engine room parts of an automobile.

SUMMARY OF THE INVENTION

Accordingly, one object of the present invention is to provide a semiaromatic polyamide which exhibits improved heat ageing properties.

Briefly, this object and other objects of the present invention as hereinafter will become more readily apparent can be attained by a polyamide composition, which comprises 100 parts by weight of (A) a semiaromatic polyamide having dicarboxylic acid units mainly composed of aromatic dicarboxylic acid units and diamine units mainly composed of aliphatic diamine units having 4 to 14 carbon atoms and containing not more than 15 μeq/g of terminal amino groups; and 0.01 to 5 parts by weight of (B) a copper compound.

It has now been discovered that there is a relationship between the number of terminal amino groups of a semiaromatic polyamide and the heat aging characteristics of a polyamide composition comprising said semiaromatic polyamide, It has been found that polyamide compositions having excellent heat aging characteristics can be obtained from a semiaromatic polyamide containing not more than 15 μeq/g of terminal amino groups and a copper compound.

U.S. Pat. No. 5,763,561, described above, describes a polyamide and indicates the number of terminal amino groups of the polyamide together with the number of terminal carboxyl groups. However, this patent does not show as an objective an intent to improve the heat aging characteristics of the polyamide compositions by adjusting the number of terminal amino groups of the semiaromatic polyamide. U.S. Pat. No. 5,003,049, Japanese Patent Application Laid-open No. Hei 7-228768 and Japanese Patent Application Laid-open No. Hei 7-228773, described above, are all silent as to the number of terminal amino groups of the semiaromatic polyamides described in these publications. The number of terminal amino groups of the semiaromatic polyamide described in these 4 documents are, to the knowledge of the present inventors, about 20 μeq/g or more (See the polyamide obtained in the Referential Example 1 and Example 2 of Japanese Patent Application Laid-open No. Hei 7-228768 and the polyamide obtained in the Examples 1 to 3 of Japanese Patent Application Laid-open No. Hei 7-228773).

In addition, a semiaromatic polyamide having (i) terephthalic acid units and 1,9-nonanediamine units or (ii) terephthalic acid units, 1,9-nonanediamine units and 2-methyl-1,8-octanediamine units is described in many patent specifications other than Japanese Patent Application Laid-open Nos. Hei 7-228768 and Hei 7-228773. For example, Japanese Patent Application Laid-open No. Hei 9-316731 discloses a conjugated fiber obtained by (A) a semiaromatic polyamide composed of terephthalic acid units and alkylenediamine units having 6 to 12 carbon atoms and (B) a thermoplastic polymer which is incompatible with the semiaromatic polyamide. However, the number of terminal amino groups of the semiaromatic polyamide described in these other patent applications are, to the knowledge of the present inventors, 20 μeq/g or more. For example, the number of terminal amino groups of the semiaromatic polyamide described in the Referential Examples 6 and 7 of Japanese Patent Application Laid-open No. Hei 9-316731 is about 30–40 μeq/g.

DETAILED DESCRIPTION OF THE PREFERRED EMBODIMENTS

Semiaromatic polyamides (A) are polyamides whose dicarboxylic acid units are mainly aromatic dicarboxylic acid units and diamine units which are mainly aliphatic diamine units having 4 to 14 carbon atoms. The dicarboxylic acid units of the semiaromatic polyamides (A) contain aromatic dicarboxylic acid units in an amount of preferably from 60 to 100 mol %, more preferably from 70 to 100 mol %, and more preferably from 80 to 100 mol %. On the other hand, the diamine units of the semiaromatic polyamides (A) contain aliphatic diamine units having 4 to 14 carbon atoms in an amount of preferably from 60 to 100 mol %, more preferably from 70 to 100 mol %, and more preferably from 80 to 100 mol %.

Suitable aromatic dicarboxylic acid units include, for example, units derived from aromatic dicarboxylic acids such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. The semiaromatic polyamides (A) may contain one or more of these aromatic dicarboxylic acid units. Among them, in view of production costs and various properties of the semiaromatic polyamides (A) containing terephthalic acid units, isophthalic acid units or 2,6-naphthalenedicarboxylic acid units are preferred. Most preferred are terephthalic acid units.

The semiaromatic polyamides (A) may contain dicarboxylic acid units other than aromatic dicarboxylic acid units. The additional dicarboxylic acid units include, for example, units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid. The semiaromatic polyamides (A) may contain one or more of these additional dicarboxylic acid units. The dicarboxylic acid units of the semiaromatic polyamides (A) can contain the additional dicarboxylic acid units in an amount of preferably not more than 40 mol %, more preferably not more than 30 mol %, still more preferably not more than 20 mol %. The semiaromatic polyamides (A) may further contain units derived from polyfunctional carboxylic acids such as trimellitic acid, trimasic acid and pyromellitic acid so long as the semiaromatic polyamide is melt-moldable.

The aliphatic diamine units having 4 to 14 carbon atoms include, for example, units derived from linear aliphatic alkylenediamines such as 1,4-tetramethylenediamine, 1,6-hexanediamine, 1,7-heptanediamine, 1,8-octanediamine, 1,9-nonanediamine, 1,10-decanediamine, 1,11-undecanediamine and 1,12-dodecanediamine; branched aliphatic alkylenediamines such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine and 5-methyl-1,9-nonanediamine. The semiaromatic polyamides (A) may contain one or more of these aliphatic diamine units. Preferred among them, in view of production costs and various properties of the semiaromatic polyamides (A) are 1,4-tetramethylenedimine units, 1,6-hexanediamine units, 1,9-nonanediamine units, 1,10-decanediamine units, 1,12-dodecanediamine units, 2-methyl-1,5-pentanediamine units, 3-methyl-1,5-pentanediamine units or 2-methyl-1,8-octanediamine units; and more preferred are 1,9-nonanediamine units and/or 2-methyl-1,8-octanediamine units.

The semiaromatic polyamides (A) may contain diamine units other than aliphatic diamine units having 4 to 14 carbon atoms. The additional diamine unit include, for example, units derived from alicyclic diamines such as cyclohexanediamine, methylcyclohexanediamine, bis(4-aminocyclohexyl)methane, bis(aminomethyl)norbornane, bis(aminomethyl)tricylodecane and bis(aminomethyl) cyclohexane; and aromatic diamines such as p-phenylenediamine, m-phenylenediamine, xylylenediamine, 4,4'-diaminodiphenylsulfone and 4,4'-diaminodiphenylether. The semiaromatic polyamides (A) may contain one or more types of these additional diamine units. The diamine units of the semiaromatic polyamides (A) can contain such additional diamine units in an amount of preferably not more than 40 mol %, more preferably not more than 30 mol %, still more preferably not more than 20 mol %. The semiaromatic polyamides (A) contain terminal amino groups in an amount of not more than 15 μeq/g, preferably not more than 12 μeq/g, more preferably not more than 10 μeq/g. A semiaromatic polyamide containing more than 15 μeq/g of terminal amino groups does not have satisfactory heat aging characteristics for the purposes of the present invention and further requires greater quantities of heat stabilizer. Such greater amounts of heat stabilizer reduce the mechanical properties of the resulting polyamide compositions and molded articles obtained therefrom.

Semiaromatic polyamides (A) preferably are those in which at least 10% of the terminal groups in the molecular chains are blocked with a terminal-blocking agent such as a monocarboxylic acid and a monoamine, that is, a monofunctional compound that reacts with the terminal amino group or terminal carboxyl group of the polyamide. The ratio of the terminal groups of the molecular chains of the semiaromatic polyamide (A) that are blocked with a terminal-blocking agent, that is the percentage of terminal-blocking, preferably is at least 40%, more preferably at least 70%. The semiaromatic polyamide (A), in which the terminal groups thereof are blocked, gives a polyamide composition having improved properties such as melt stability and resistance to hot water or steam. The amount of the terminal-blocking agent is properly set depending on the various factors such as the molecular weight of the polyamide, the reactivity of the terminal-blocking agent, the boiling point of the terminal-blocking agent, the kind of reaction vessel and reaction conditions. The amount of the terminal-blocking agent preferably ranges from 0.1 and 15% by mole relative to the total amount of the dicarboxylic acid component and the diamine component.

The monocarboxylic acids include, for example, aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid: aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any of these acids. Among them, preferred are acetic acid, propionic acid, butyric acid, valeric acid, caproic acid, caprylic acid, lauric acid, tridecanoic acid, myristic acid, palmitic acid, stearic acid and benzoic acid, in view of their reactivities, costs and the stability of the blocked terminals.

Suitable monoamine blocking agents include, for example, aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and mixtures thereof. Preferred among the monoamines are butylamine, hexylamine, octylamine, decylamine, stearylamine, cyclohexylamine and aniline, in view of their reactivities, boiling points, costs and the stability of blocked terminals.

Semiaromatic polyamides having a reduced number of terminal amino groups and desired molecular weight can be prepared by (i) reacting a polyamide with a terminal-blocking agent in appropriate molar amounts and (ii) setting the molar ratio, that is the balance of moles, of dicarboxylic acid component based on the diamine component. It is also important to conduct a complete reaction between the functional groups of a terminal-blocking agent, a dicarboxylic acid component or a diamine component, in order to reduce the number of terminal amino groups of the polyamide.

For example, semiaromatic polyamides (A) can be produced by a method comprising the steps of (i) forming a nylon salt by mixing a diamine component and a dicarboxylic acid component, if necessary, together with a catalyst and/or a terminal-blocking agent; (ii) converting the formed nylon salt, at the temperature of 200 to 250° C., into a prepolymer having an intrinsic viscosity [η] of 0.1 to 0.6 dl/g as determined in concentrated sulfuric acid at 30° C. and (iii) subjecting the prepolymer to a solid phase polymerization or polymerization with a melt extruder.

In mixing step (i), it is important to use an appropriate molar amount of a terminal-blocking agent and to use a dicarboxylic acid and diamine component in an appropriate molar ratio. It is preferred to adjust the amount of the above-described components to satisfy the following equation (1):

$$0.1 \leq [(X-Y)/X] \times 100 \leq 2.0 \tag{1}$$

wherein X is the total amount, expressed in moles, of carboxyl groups contained in the dicarboxylic acid component, the catalyst and the terminal-blocking agent, and Y is the total amount, expressed in moles, of amino groups present in the diamine component, the catalyst and the terminal-blocking agent.

In the steps (ii) and (iii), when the intrinsic viscosity [η] of the prepolymer falls within the range of 0.1 to 0.6 dl/g, polymerization of the prepolymer proceeds with good retention of a balance between carboxyl groups and amino groups and with little decrease in the polymerization rate to give a polyamide having a small molecular weight distribution, excellent properties and excellent moldability. When the polymerization of the prepolymer is done by solid phase polymerization, polymerization is preferably conducted under reduced pressure or under a stream of an inert gas. In addition, at a temperature of 200 to 280° C., polymerization proceeds at a high polymerization rate, good productivity and reduced coloring or gelation. On the other hand, when the polymerization of the prepolymer is done in a melt extruder, it is desirable to employ a polymerization temperature of not more than 370° C., in view of the objective of producing a polyamide having a minimum of degradation.

In the step (iii), it is important to conduct a complete reaction between the functional groups of a terminal-blocking agent, a dicarboxylic acid component, and a diamine component.

In the preparation of the semiaromatic polyamides (A), a phosphorus-based compound can be used as a catalyst. The phosphorus-based compound includes, for example, phosphoric acid, phosphorous acid, hypophosphorous acid, and salts or ester derivatives thereof such as a salt of (a) phosphoric acid, phosphorous acid or hypophosphorous acid and (b) a metal of sodium, potassium, magnesium, vanadium, calcium, zinc, cobalt, manganese, tin, tungsten, germanium, titanium or antimony; ammonium phosphate, ammonium phosphite, ammonium hypophosphate; and ethyl esters, isopropyl esters, butyl esters, hexyl esters, isodecyl esters, octadecyl esters, decyl esters, stearyl esters or phenyl esters of (a) phosphoric acid, phosphorous acid or hypophosphorous acid. O these, preferred are sodium hypophosphite and phosphorous acid, in view of the reaction rate of the polymerization reaction, the heat stability of the phosphorus compounds and costs.

The amount of the phosphorus-based compound preferably employed ranges from 0.01 to 5% by weight, more preferably from 0.05 to 2% by weight, still more preferably from 0.07 to 1% by weight, relative to the total amount of the dicarboxylic acid component and the diamine component.

The intrinsic viscosity [η] of the semiaromatic polyamide (A), as measured in concentrated sulfuric acid at 30° C., preferably ranges from 0.4 to 3.0 dl/g, more preferably from 0.5 to 2.0 dl/g, still more preferably from 0.6 to 1.8 dl/g, in view of the balance between melt flowability and moldability of the product.

The melting point of the semiaromatic polyamide (A) preferably is not less than 250° C., more preferably from 270 and 330° C., in view of mechanical properties of the polyamide which results from its excellent crystallinity.

The polyamide composition of the present invention contains (B) a copper compound. Copper compounds include, for example, copper halides such as copper (I) chloride, copper (I) bromide, copper (I) iodide, copper (II) chloride, copper (II) bromide and copper (II) iodide; inorganic acid salts of copper such as copper (I) phosphate, copper (II) pyrophosphate, copper (II) sulfate and copper (II) nitrate; carboxylic acid salts of copper such as copper (II) acetate; copper complexes such as copper (II) acetylacetonate. More preferred among the copper compounds are copper (I) compounds, such as copper (I) halides, and most preferred is copper (I) iodide. The polyamide composition may contain one or more of these copper compounds.

The amount of copper compound (B) employed ranges from 0.01 to 5 part by weight, preferably from 0.02 to 0.5 part by weight, based on the 100 part by weight of the semiaromatic polyamide (A).

The polyamide composition of the present invention can preferably contain (C) an alkali metal halide in an amount of 1 to 20 times by weight of the copper compound (B). Suitable alkali metal halides include, for example, lithium chloride, lithium bromide, lithium iodide, sodium fluoride, sodium chloride, sodium bromide, sodium iodide, potassium fluoride, potassium chloride, potassium bromide and potassium iodide. Among them, potassium iodide is preferred. The polyamide composition may contain one or more of these alkali metal halides. The amount of alkali metal halide (C) more preferably ranges from 1 to 15 times by weight of the copper compound (B).

In addition, the alkali metal halide (C) is used in an amount of preferably from 0.01 to 5 part by weight, more preferably from 0.02 to 5 part by weight, based on 100 parts by weight of the semiaromatic polyamide (A).

A copper compound (B) and/or an alkali metal halide (C) can be used in solid form or in a solution dissolved in an appropriate solvent such as water, methanol, ethanol, 2-propanol, 1,4-dioxane, dimethoxyethane, N,N-dimethylformamide [DMF] and dimethylsulfoxide [DMSO].

The polyamide composition of the present invention can contain (D) a filler in an amount of not more than 60% by weight based on the total weight of the polyamide composition. Suitable fillers include, for example, fibrous fillers such as glass fibers, carbon fibers, boron fibers, aramide fibers and liquid crystalline polyester fibers; needle-like fillers such as whiskers of potassium titanate, whiskers of calcium carbonate, whiskers of aluminum borate, whiskers of zinc oxide; or powdery fillers such as talc, mica, kaolin, clay, calcium carbonate, silica, silica-alumina, alumina, titanium oxide, graphite, molybdenum disulfide, montmorillonite, polytetrafluoroethylene and high molecular weight polyethylene. The polyamide composition may contain one or more of these fillers. Preferred among them, from the viewpoint of mechanical properties of the molded article obtained from the resulting polyamide composition, are glass fibers, carbon fibers, whiskers of potassium titanate and whiskers of aluminum borate. From the point of view of the ability of molded articles prepared from the polyamide composition to slide over surfaces, preferred fillers are carbon fibers, aramide fibers, whiskers of potassium titanate, whiskers of calcium carbonate, whiskers of zinc oxide, talc, mica, graphite, molybdenum disulfide, polytetrafluoroethylene and high molecular weight polyethylene. In addition, preferred fillers include silica, alumina, talc, mica or whiskers of aluminum borate, from the viewpoint of the dimensional stability of the molded article obtained from the resulting polyamide composition.

The fillers may be treated with silane couplers or titanium couplers.

The polyamide composition of the present invention includes an organic stabilizer, if needed or required. Suitable organic stabilizers include, for example, phenol-based, amine-based, phosphorus-based or thioether-based stabilizers. The polyamide composition may contain one or more of these organic stabilizers. Among them, preferred are phenol-based, amine-based or phosphorus-based stabilizers, and more preferred are stabilizers which do not coordinate with a copper compound (B). The amount of the organic stabilizer employed preferably ranges from 0.01 to 5 part by weight based on 100 parts by weight of the semiaromatic polyamide (A).

The polyamide composition of the present invention can contain other additives in an amount, in total, of not more than 50% by weight based on the total weight of the polyamide composition. Such additives include, for example, flame retardants such as brominated polymers, antimony oxide, metal oxides, metal hydroxides, phosphorous compounds, polymers containing phosphorus, silicone-based compounds and compounds containing nitrogen; UV absorbents such as benzophenone-based compounds, benzotriazole-based compounds, benzoic acid-based compounds; antistatic agents; plasticizers; lubricants; nucleating agents; processing aids; colorants, e.g., of pigments or dyes; anti-dripping agents; impact modifiers; various thermoplastic polymers other than the semiaromatic polyamides (A).

The polyamide compositions of the present invention can be prepared by blending (A) a semi aromatic polyamide and (B) a copper compound, and if necessary, together with other components described above, by any conventional method. The semiaromatic polyamide (A), the filler (D) and the stabilizers are preferably used in a form of a powder or a pellet. A uniform polyamide composition can be preferably prepared, for example, by kneading in a device for melt mixing such as a twin screw extruder, at a temperature at which the semiaromatic polyamide (A) is molten. In such a case, it is desired that the semiaromatic polyamide (A), the copper compound (B) and other components are dry blended, before kneading, as in a solid form such as a powder or a pellet.

The polyamide compositions of the present invention can also be prepared by blending 100 parts by weight of (A') a semiaromatic polyamide having dicarboxylic acid units mainly composed of aromatic dicarboxylic acid units and diamine units mainly composed of aliphatic diamine units having 4 to 14 carbon atoms, 0.01 to 5 parts by weight of (B) a copper compound and (E) an organic compound which is reactive with the terminal amino groups of the semiaromatic polyamide (A') in an amount of 0.1 to 10 equivalent of the number of terminal amino groups of the semiaromatic polyamide (A'), by kneading of the ingredients under molten conditions. The semiaromatic polyamides (A') may contain more than 15 $\mu$eq/g of terminal amino groups. For example, the polyamide compositions of the present invention can be prepared by (i) blending (A') a semiaromatic polyamide, (B) a copper compound and (E) an organic compound which is reactive with terminal amino groups of the semiaromatic polyamide (A'), and if necessary, together with other components described above, by a tumbler or a Henshel mixer and (ii) subjecting the resulting blend to melt kneading with a twin screw extruder at a temperature higher than the melting point of the semiaromatic polyamide (A'). When a fibrous filler or a needle-like filler is used as one of the components of the formulation, it is desirable to feed the filler to the extruder through a side feeder. The polyamide composition obtained is preferably extruded as a strand and cut in pieces to give a pellet.

The organic compound (E) that is reactive with the amino group is preferably a compound having a molecular weight of not less than 100, in view of the prevention of evaporation during kneading. Suitable organic compounds (E) include, for example, monocarboxylic acids such as stearic acid, cyclohexanecarboxylic acid, benzoic acid, anisic acid; dicarboxylic acids such as adipic acid, azelaic acid, sebacic acid, terephthalic acid and 4,4'-oxydibenzoic acid; acid anhydrides such as trimellitic anhydride, 1,8-naphthalic anhydride, phthalic anhydride and maleic anhydride; dianhydrides of tetracarboxylic acid such as pyromellitic anhydride; isocyanates such as phenyl isocyanate; diisocyanates such as 4,4'-diphenylmethane diisocyanate, tolylene diisocyanate, xylylene diisocyanate, hexamethylene diisocyanate and isophorone diisocyanate; and epoxy compounds such as bisphenol A epoxy resins. Suitable among them are acid anhydrides, which are preferred from the viewpoint of reactivity with the amino group. The amount of the organic compound (E) is ranges from 0.1 to 10 equivalents based on the molar amount of the terminal amino groups contained in the semiaromatic polyamide (A'), in order to produce a polyamide composition having excellent heat aging characteristics. The amount of the organic compound (E) preferably ranges from 0.5 to 5 equivalents, more preferably from 1 to 3 equivalents, based on the number of moles of the terminal amino groups contained in the semiaromatic polyamide (A').

The polyamide compositions of the present invention can be converted into various molded articles by injection molding, extrusion and so on. The polyamide compositions of the present invention are preferably used for producing automobile engine compartment parts.

In addition, the polyamide compositions of the present invention can be widely used as molding materials for electrical and electronic parts, automobile parts, industrial materials and household goods, because they have excellent heat aging characteristics, as well as excellent heat resistance, impact resistance, low-water-absorption property, hot water and steam resistance and chemical resistance.

The semiaromatic polyamides (A) having dicarboxylic acid units mainly composed of aromatic dicarboxylic acid units and diamine units mainly composed of aliphatic diamine units having 4 to 14 carbon atoms and containing not more than 15 $\mu$eq/g of terminal amino groups are novel. The semiaromatic polyamides (A) are not only an important component of the polyamide composition of the present invention, but also can be used for various applications as it is or as formulated into polyamide compositions blended with other components such as polymeric compounds, various additives and inorganic fillers.

Having generally described this invention, a further understanding can be obtained by reference to certain specific examples which are provided herein for purposes of illustration only and are not intended to be limiting unless otherwise specified.

In the following Examples and Comparative Examples, the intrinsic viscosity, the number of terminal carboxyl groups, the number of terminal amino groups, deflection temperature under load, water absorption, dimensional stability, hot water resistance, chemical resistance and heat aging characteristics are evaluated according to the following procedures.

Intrinsic Viscosity [η]

A sample of the polyamide or the polyamide composition to be measured is dissolved in concentrated sulfuric acid to give solutions having a concentration of 0.05, 0.1, 0.2 or 0.4 g/dl, and the inherent viscosity ηinh of each sample solution is measured at 30° C. as follows:

ηinh=[$ln(t_1/t_0)$]/C (dl/g), wherein $t_0$ is the flow down time (seconds) of the solvent, $t_1$ is the flow down time (seconds) of the sample solution and C is the concentration of the sample in the sample solution.

Extrapolating the data of ηinh with the control having a concentration of 0 gives the intrinsic viscosity [η] of the sample.

When the sample solution contains undissolved solid matter, such solid matter is discharged by filtration using a 0.5 $\mu$m aperture-membrane filter and the filtrate obtained is tested for its inherent viscosity.

Number of Terminal Carboxyl Groups

A 1g amount of a polyamide or a polyamide composition is dissolved in 35 ml of o-cresol with heating. After cooling to room temperature, 20 ml of benzyl alcohol and 250 $\mu$l of formaldehyde are added to the resulting solution to give a sample solution. The sample solution obtained is subjected to potentiometric titration with a 0.1 N solution of potassium hydroxide in methanol to determine the number of terminal carboxyl groups.

The test results for a polyamide composition are converted into the number of terminal carboxyl groups of the polyamide contained in the polymer based on the weight ratio of the component of the polyamide composition.

Number of Terminal Amino Groups

A 1g amount of a polyamide or a polyamide composition is dissolved in 35 ml of phenol. 2 ml of methanol is added to the resulting solution to give a sample solution. The sample solution obtained is subjected to titration with 0.01 N aqueous hydrochloric acid using Thymol Blue as an indicator to determine the number of terminal amino groups.

The test result for a polyamide composition is converted into the number of terminal amino groups of the polyamide contained in the polymer based on the weight ratio of the component of the polyamide composition.

Deflection Temperature Under Load

Deflection temperature under load is determined according to the method of JIS k7207, under the load of 1.86 MPa, using a thoroughly dried test piece having a length of 127 mm, a width of 14 mm and a thickness of 6.4 mm, prepared by injection molding at a temperature which is higher than the melting point of the polyamide by about 20° C.

Water Absorption and Dimensional Stability

A test piece having a length of 80 mm, a width of 80 mm and a thickness of 3 mm is prepared by injection molding at a temperature which is higher than the melting point of the polyamide by about 20° C. The test piece is thoroughly dried to determine the weight [$W_0$] and the length ($L_0$). The test piece is immersed in water at 23° C. for 24 hours to determine the weight [$W_1$] and the length [$L_1$]. Water absorption and dimensional stability are calculated as follows.

Water absorption (%)=[$(W_1-W_0)/W_0$]×100

Dimensional stability (%)=[$(L_1-L_0)/L_0$]×100

Hot Water Resistance

A test piece having a shape of JIS No. 1 dumbbell-type and a thickness of 3 mm, prepared by injection molding at a temperature which is higher than the melting point of the polyamide by about 20° C., is treated with steam in an autoclave under 2 atmospheric pressures, at 120° C. for 120 hours. The test piece thus treated with steam is tested for its tensile strength according to JIS k7113. The retention of tensile strength (%) against the values before the steam treatment is calculated.

Chemical Resistance

A film having a thickness of 200 $\mu$m prepared by heat pressing at a temperature higher than the melting point of polyamide by about 20° C. is punched with JIS No. 3 Dumbbell to give a test piece. The test piece is immersed in methanol at 23° C. for 7 days and then tested for tensile strength according to the method of JIS k7113. The retention of tensile strength (%) against the tensile strength before immersion in methanol is calculated.

Heat Aging Characteristics

A test piece having a shape of JIS No. 1 dumbbell-type and a thickness of 3 mm, prepared by injection molding at a temperature which is higher than the melting point of the polyamide by about 20° C., is thoroughly dried and allowed to stand in a gear-oven at 180° C. for 14 days. The test piece thus treated is tested for its tensile strength according to JIS k7113. The retention of tensile strength (%) against the values before the heat treatment is calculated.

EXAMPLES

Example 1

(1) Preparation of Semiaromatic Polyamide

An autoclave having an inner volume of 20 liters was charged with 4634.2 g (27.8 moles) of terephthalic acid, 4432.1 g (28.0 moles) of a mixture of 80% of 1,9-nonanediamine and 20% of 2-methyl-1,8-octanediamine, 85.5 g (0.70 mole) of benzoic acid, 9.12 g (0.1% by weight based on the total weight of raw materials) of sodium hypophosphite monohydrate and 2.5 liters of distilled water under nitrogen. The resulting mixture was agitated at 100° C. for 30 minutes, then the temperature of the mixture was elevated to 220° C. over 2 hours under agitation. At this time, the inner pressure of the autoclave was 2 MPa. The reaction mixture was agitated at 220° C. for 2 hours, then the temperature of the mixture was elevated to 230° C. with agitation. The reaction was further conducted for 2 hours under constant temperature of 230° C. and pressure of 2 MPa which was kept constant by discharging the water which formed. Thereafter, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.18 dl/g. The prepolymer was dried at 100° C. under reduced pressure for 12 hours and then pulverized to a particle size of not more than 2 mm. The particles were subjected to solid phase polymerization at 230° C. under 13 Pa [0.1 mmHg] of pressure for 10 hours to give a white polyamide having a melting point of 306° C., an intrinsic viscosity [η] of 1.51 dl/g, a number of terminal amino groups of 12 μeq/g and a number of terminal carboxyl groups of 42 μeq/g.

This polyamide was abbreviated as "PA9T-1".

(2) Preparation of Polyamide Composition

PA9T-1 obtained above was dried at 120° C. under reduced pressure for 14 hours. 100 part by weight of PA9T-1, thus dried, was mixed with a solution of 0.4 part by weight of potassium iodide [KI] and 0.05 part by weight of copper (I) iodide [CuI] in 0.4 part by weight of water. The resulting mixture was allowed to stand at room temperature for 12 hours and then dried at 120° C. in a vacuum oven for 12 hours. The resulting blend was kneaded and extruded by a twin-screw extruder [Laboplastmill 2D25W: made by Toyo Seiki Seisakusho Inc.] under the condition of a cylinder temperature of 330° C. and a rotating speed of 40 r.p.m. to give pellets of polyamide composition. The obtained pellet was dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The pellet obtained was subjected to injection molding by an injection molder [NS15; made by Nissei Jushi Kogyo Inc.] under the condition of a cylinder temperature of 330° C. and a mold temperature of 150° C. to give a molded article. The molded article obtained was tested for deflection temperature under load, water absorption, dimensional stability, hot water resistance, chemical resistance and heat aging characteristics. Results are also shown in Table 1.

Example 2

(1) Preparation of Semiaromatic Polyamide

An autoclave having an inner volume of 20 liters was charged with 4601.0 g (27.7 moles) of terephthalic acid, 4432.1 g (28.0 moles) of 1,9-nonanediamine, 116.0 g (0.95 mole) of benzoic acid, 9.12 g (0.11% by weight based on the total weight of raw materials) of sodium hypophosphite monohydrate and 2.5 liters of distilled water under nitrogen. The resulting mixture was agitated at 100° C. for 30 minutes, and then the temperature of the mixture was elevated to 220° C. over 2 hours under agitation. At this time, the inner pressure of the autoclave was 2 MPa. The reaction mixture was agitated at 220° C. for 2 hours, and then the temperature of the mixture was elevated to 230° C. under agitation. The reaction was further conducted for 2 hours under constant temperature of 230° C. and a pressure of 2 Ma which was kept constant by discharging the water which formed. Thereafter, the inner pressure of the autoclave was reduced to 1 MPa over 30 minutes and the reaction mixture was further agitated for 1 hour at 230° C. under a pressure of 1 MPa to give a prepolymer having an intrinsic viscosity [η] of 0.15 dl/g. The prepolymer was dried at 100° C. under reduced pressure for 12 hours and then pulverized to a particle size of not more than 2 mm. The particles were subjected to solid phase polymerization at 230° C. under 13 Pa [0.1 mmHg] of pressure for 10 hours to give a white polyamide having a melting point of 317° C., an intrinsic viscosity [η] of 1.30 dl/g, a number of terminal amino groups of 9 μeq/g and a number of terminal carboxyl groups of 41 μeq/g. This polyamide was abbreviated as "PA9T-2".

(2) Preparation of Polyamide Composition

The procedure of Example 1 (2) was repeated except that 100 parts by weight of PA9T-2 was used instead of 100 parts by weight of PA9T1 to give pellets of polyamide composition. The pellets obtained were dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The pellets obtained were subjected to injection molding by an injection molder [NS15: made by Nissei Jushi Kogyo Inc.] under the condition of a cylinder temperature of 330° C. and a molding temperature of 154° C. to give a molded article. The molded articles obtained were tested for deflection temperature under load, water absorption, dimensional stability, hot water resistance. Chemical resistance and heat aging characteristics. Results are also shown on the Table 1.

Example 3

(1) Preparation of Semiaromatic Polyamide

An autoclave having an inner volume of 20 liters was charged with 4667.4 g (28.1 moles) of terephthalic acid, 4432.1 g (28.0 moles) of a mixture of 80% of 1,9-nonanediamine and 20% of 2-methyl-1,8-octanediamine, 102.6 g (0.84 mole) of benzoic acid, 9.20 g (0.1% by weight based on the total weight of raw materials) of sodium hypophosphite monohydrate and 2.5 liters of distilled water under nitrogen. The resulting mixture was agitated at 100° C. for 30 minutes, then the temperature of the mixture was elevated to 220° C. over 2 hours under agitation. At this time, the inner pressure of the autoclave was 2 MPa. The reaction mixture was agitated at 220° C. for 2 hours, and then the temperature of the mixture was elevated to 230° C. under agitation. The reaction was further conducted for 2 hours under constant temperature of 230° C. and a pressure of 2 MPa which was kept constant by discharging the water which formed. Thereafter, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.16 dl/g. The prepolymer was dried at 100° C. under reduce pressure for 12 hours and then pulverized to a particle size of not more than 2 mm. The particles were subjected to solid phase polymerization at 230° C. under 13 Pa [0.1 mmHg] of pressure for 10 hours to give a white polyamide having a melting point of 306° C., an intrinsic viscosity [η] of 0.90 dl/g, a number of terminal amino groups of 12 μeq/g and a number of terminal carboxyl groups of 76 μeg/g. This polyamide was abbreviated as "PA9T-3".

(2) Preparation of Polyamide Composition

PA9T-3 obtained above was dried at 120° C. under reduced pressure for 14 hours. 100 parts by weight of PA9T-3. The dried material was mixed with a solution of 0.4 part by weight of potassium iodide [KI] and 0.05 part by weight of copper (1) iodide [CuI] in 0.4 part by weight of water. The resulting mixture was allowed to stand at room temperature for 12 hours and then dried at 120° C. in a vacuum oven for 12 hours. 30 parts by weight of glass fiber [3540; made by PPG Inc.] was blended with the dried mixture of PA9T-3, KI and CuI. The resulting blend was kneaded and extruded by a twin-screw extruder [Laboplastmill 2D25W; made by Toyo Seiki Seisakusho Inc.] under the condition of a cylinder temperature of 330° C. and a rotating speed of 40 r.p.m. to give pellets of polyamide composition. The obtained pellet was dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The pellets obtained were subjected to injection molding by an injection molder [NS15; made by Nissei Jushi Kogyo Inc.] under the condition of a cylinder temperature of 330° C. and a molding temperature of 150° C. to give a molded article. The molded article obtained was tested for deflection temperature under load, water absorption, dimensional stability, hot water resistance, chemical resistance and heat aging characteristics.

Results are also shown on the Table 1.

Comparative Example 1

(1) Preparation of Semiaromatic Polyamide

An autoclave having an inner volume of 20 liters was charged with 4584.4 g (27.6 moles) of terephthalic acid, 4527.1 g (28.6 moles) of a mixture of 80% of 1,9-nonanediamine and 20% of 2-methyl-1,8-octanediamine, 102.6 g (0.84 mole) of benzoic acid, 9.21 g (0.1% by weight based on the total weight of raw materials) of sodium hypophosphite monohydrate and 2.5 liters of distilled water under nitrogen. The resulting mixture was agitated at 100° C. for 30 minutes, then the temperature of the mixture was elevated to 220° C. over 2 hours under agitation. At this time, the inner pressure of the autoclave was 2 MPa. The reaction mixture was agitated at 220° C., for 2 hours, and then the temperature of the mixture was elevated to 230° C. with agitation. The reaction was further conducted for 2 hours at constant temperature of 230° C. and pressure of 2 MPa which was kept constant by discharging the water which had formed. Thereafter, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.16 dl/g. The prepolymer was dried at 100° C. under reduced pressure for 12 hours and then pulverized to a particle size of not more than 2 mm. The particles were subjected to solid phase polymerization at 230° C. under 13 Pa [0.1 mmHg] of pressure for 10 hours to give a white polyamide having a melting point of 306° C., an intrinsic viscosity [11] of 1.40 dl/g, a number of terminal amino groups of 30 μeq/g and a number of terminal carboxyl groups of 16 μeq/g. This polyamide was abbreviated as "PA9T-4".

(2) Preparation of Polyamide Composition

The procedure of Example 1 (2) was repeated except that 100 parts by weight of PA9T-4 were used instead of 100 part by weight of PA9T-1 to give pellets of polyamide composition. The obtained pellet was dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The pellets obtained were subjected to injection molding by an injection molder [NS15; made by Nissei Jushi Kogyo Inc.] under the condition of a cylinder temperature of 330° C., and a mold temperature of 150° C. to give a molded article. The obtained molded article was tested for deflection temperature under load, water absorption, dimensional stability, hot water resistance, chemical resistance and heat aging characteristics. Results are also shown on the Table 1.

Comparative Example 2

(1) Preparation of Semiaromatic Polyamide

An autoclave having an inner volume of 20 liters was charged with 3438.3 g (20.7 moles) of terephthalic acid, 1007.4 g (6.9 moles) of adipic acid, 2561.1 g (22.0 moles) of 1,6-hexanediamine, 765.0 g (6.6 moles) of 2-methyl-1, 5-pentanediamine, 50.4 g (0.84 mole) of acetic acid, 7.77 g of sodium hypophosphite monohydrate and 2.5 liters of distilled water under nitrogen. The resulting mixture was agitated at 100° C., for 30 minutes, then the temperature of the mixture was elevated to 220° C. over 2 hours under agitation. At this time, the inner pressure of the autoclave was 2 MPa. The reaction mixture was agitated at 220° C. for 2 hours, and then the temperature of the mixture was elevated to 230° C. under agitation. The reaction was further conducted for 2 hours under constant temperature of 230° C.; and pressure of 2 MPa which was kept constant by discharging the water which had formed. Thereafter, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.19 dl/g. The prepolymer was dried at 100° C. under reduce pressure for 12 hours and then pulverized to a particle size of not more than 2 mm. The particles were subjected to solid phase polymerization at 230° C., under 13 Pa [0.1 mmHg] of pressure for 10 hours to give a white polyamide having dicarboxylic acid unit of 75 mole % of terephthalic acid unit and 25 mole % of adipic acid unit and diamine unit of 77 mole of 1;6-hexanediamine unit and 23 mole of 2-methyl-1,5-pentanediamine unit and having an intrinsic viscosity

[η] of 1.04 dl/g, a number of terminal amino groups of 91 μeq/g and a number of terminal carboxyl groups of 14 μeq/g. This polyamide was abbreviated as "PA6M-6T".

(2) Preparation of Polyamide Composition

Procedures of the Example 1 (2) were repeated except that 100 parts by weight of PA6M-6T was used instead of 100 parts by weight of PA9T-1 to give pellets of polyamide composition. The obtained pellet was dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The obtained pellet was subjected to injection molding by an injection molder [NS15; made by Nissei Jushi Kogyo Inc.] under the condition of a cylinder temperature of 330° C. and a mold temperature of 150° C. to give a molded article. The obtained molded article was tested for deflection temperature under load, water absorption, dimensional stability, hot water resistance, chemical resistance and heat aging characteristics. Results are also shown on the Table 1.

Comparative Example 3

(1) Preparation of Semiaromatic Polyamide

An autoclave having an inner volume of 20 liters was charged with 3322 g (20.0 moles) of terephthalic acid, 3166 g (20.0 moles) of 1,9-nonanediamine, 48.8 g (0.4 mole) of benzoic acid, 5.28 g (0.06 mole) of sodium hypophosphite monohydrate and 2.2 liters of distilled water under nitrogen. The resulting mixture was agitated at 100° C. for 30 minutes, then the temperature of the mixture was elevated to 210° C. over 2 hours with agitation. At this time, the inner pressure of the autoclave was 2.2 MPa. The reaction mixture was agitated at 210° C., for 1 hours, and then the temperature of the mixture was elevated to 230° C. under agitation. The reaction was further conducted for 2 hours under constant temperature of 230° C. and pressure of 2.2 MPa which was kept constant by discharging the water which formed. Thereafter, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.17 dl/g. The prepolymer was dried at 100° C. under reduce pressure for 12 hours and then pulverized to a particle size of not more than 2 mm. The particles were subjected to solid phase polymerization at 230° C., under 13Pa [0.1 mmHg] of pressure for 10 hours to give a white polyamide having a melting point of 312° C., an intrinsic viscosity [η] of 1.11 dl/g, a number of terminal amino groups of 32 μeq/g and a number of terminal carboxyl groups of 10 μeq/g. This polyamide was abbreviated as "PA9T-5".

PA9T-5 is identical with the polyamide obtained in the Referential Example 6 of the Japanese Patent Application Laid-open No. Hei 9-316731 (JPA 316731/97).

(2) Preparation of Polyamide Composition

Procedures of the Example 1 (2) were repeated except that 100 parts by weight of PA9T-5 was used instead of 100 parts by weight of PA9T-1 to give pellets of polyamide composition. The obtained pellet was dried at 120° C., under vacuum for 12 hours. The intrinsic viscosity of the polyamide composition [η], the number of terminal amino groups of the polyamide and the number of terminal carboxyl groups of the polyamide were determined. Results are shown on the Table 1. The obtained pellet was subjected to injection molding by an injection molder [NS15; made by Nissei Sushi Kogyo Inc. ] under the condition of a cylinder temperature of 330° C., and a mold temperature of 150° C., to give a molded article. The obtained molded article was tested for deflection temperature under load, water absorption, dimensional stability, hot water resistance, chemical resistance and heat aging characteristics. Results are also shown on the Table 1.

Comparative Example 4

(1) Preparation of Semiaromatic Polyamide

An autoclave having an inner volume of 20 liters was charged with 3355 g (20.2 moles) of terephthalic acid, 2691 g (17.0 moles) of 1,9-nonanediamine, 475 g (3.0 moles) of 2-methyl-1,8-octanediamine, 36.6 g (0.3 mole) of benzoic acid, 5.28 g (0.06 mole) of sodium hypophosphite monohydrate and 2.2 liters of distilled water under nitrogen. The resulting mixture was agitated at 100° C. for 30 minutes, then the temperature of the mixture was elevated to 210° C., over 2 hours with agitation. At this time, the inner pressure of the autoclave was 2.2 MPa. The reaction mixture was agitated at 210° C. for 1 hour, then the temperature of the mixture was elevated to 230° C. with agitation. The reaction was further conducted for 2 hours under constant temperature of 230° C. and pressure of 2.2 MPa which was kept constant by discharging the water which had formed. After that, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.20 dl/g. The prepolymer was dried at 100° C. under reduced pressure for 12 hours and then pulverized to a particle size of not more than 2 mm. The particles were subjected to solid phase polymerization at 230° C., under 13 Pa [0.1 mmHg] of pressure for 10 hours to give a white polyamide having a melting point of 299° C., an intrinsic viscosity [η] of 1.02 dl/g, a number of terminal amino groups of 44 μeq/g and a number of terminal carboxyl groups of 9 μeq/g. This polyamide was abbreviated as "PA9T-6".

PA9T-6 is identical with the polyamide obtained in the Referential Example 7 of the Japanese Patent Application Laid-open No. Hsi 9-316731 (JPA 316731/97).

(2) Preparation of Polyamide Composition

The procedure of Example 1 (2) was repeated except that 100 parts by weight of PA9T-6 was used instead of 100 part by weight of PA9T-1 to give pellets of polyamide composition. The pellets obtained were dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The obtained pellet was subjected to injection molding by an injection molder [NS15; Made by Nissei Jushi Kogyo Inc .] under the condition of a cylinder temperature of 330° C. and a mold temperature of 150° C. to give a molded article. The obtained molded article was tested for deflection temperature under load, water absorption, dimensional stability, hot water resistance, chemical resistance and heat aging characteristics. Results are also shown on the Table 1.

Comparative Example 5

(1) Preparation of Semiaromatic Polyamide

An autoclave having an inner volume of 20 liters was charged with 3272.9 g (19.7 moles) of terephthalic acid, 2849.2 g (18.0 moles) of 1,9-nonanediamine, 316.58 g (2.0 moles) of 2-methyl-1,8-octanediamine, 73.27 g (0.6 mole) of benzoic acid, 6.5 g of sodium hypophosphite monohydrate and 2.2 liters of distilled water under nitrogen. The resulting mixture was agitated at 100° C. for 30 minutes, and then the temperature of the mixture was elevated to 210° C. over 2 hours under agitation. At this time, the inner pressure of the autoclave was 2.2 MPa. The reaction mixture was agitated at 210° C. for 1 hours, and then the temperature of the mixture was elevated to 230° C. under agitation. The reaction was further conducted for 2 hours under constant temperature of 230° C. and pressure of 2.2 MPa which was kept constant by discharging the water which had formed. After that, the inner pressure of the autoclave was reduced to 1 MPa over 30 minutes and the reaction mixture was further agitated for 1 hour at 230° C. under the pressure of 1 MPa to give a prepolymer having an intrinsic viscosity [η] of 0.20 dl/g. The prepolymer was dried at 100° C. under reduced pressure for 12 hours and then pulverized to a particle size of not more than 2 mm. The particles were subjected to solid phase polymerization at 230° C. under 13 Pa [0.1 mmHg] of pressure for 10 hours to give a white polyamide having a melting point of 305° C., an intrinsic viscosity [η] of 1.23 dl/g, a number of terminal amino groups of 23 µeq/g and a number of terminal carboxyl groups of 28 µeq/g. This polyamide was abbreviated as "PA9T-7".

PA9T-7 is identical with the polyamide obtained in the Example 25 of the Japanese Patent Application Laid-open No. Hei 7-228768 (JPA 228768/95).

(2) Preparation of Polyamide Composition

The procedure of Example 1 (2) was repeated except that 100 parts by weight of PA9T-7 was used instead of 100 parts by weight of PA9T-1 to give pellets of polyamide composition. The obtained pellet was dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The pellets obtained were subjected to injection molding by an injection molder [NS15; made by Nissei Jushi Kogyo Inc.] under the condition of a cylinder temperature of 330° C. and a mold temperature of 150° C. to give a molded article. The molded article obtained was tested for deflection temperature under load, water absorption, dimensional stability, hot water resistance, chemical resistance and heat aging characteristics. Results are also shown on the Table 1.

Example 4

The procedure of Example 1 (2) was repeated except that 0.05 part by weight of copper (I) chloride [CuCl] was used instead of 0.05 part by weight of copper (I) iodide to give pellets of polyamide composition. The pellets obtained were dried at 120° C. under vacuum for 12 hours. The intrinsic viscosity of the polyamide composition [η], the number of terminal amino groups of the polyamide and the number of terminal carboxyl groups of the polyamide were determined. Results are shown on the Table 1. The obtained pellet was subjected to injection molding by an injection molder [NS15; made by Nissei Jushi Kogyo Inc.] under the condition of a cylinder temperature of 330° C. and a mold temperature of 150° C., to give a molded article. The obtained molded article was tested for deflection temperature under load, water absorption, dimensional stability, hot water resistance, chemical resistance and 10 heat aging characteristics. Results are also shown on the Table 1.

TABLE 1

|  | Ex. 1 | Ex. 2 | Ex. 3 | Comp Ex. 1 | Comp. Ex. 2 | Comp. Ex. 3 | Comp. Ex. 4 | Comp. Ex. 5 | Ex. 4 |
|---|---|---|---|---|---|---|---|---|---|
| Semiaromatic Polyamide [Part by Weight] | | | | | | | | | |
| PA9T-1 | 100 | | | | | | | | 100 |
| PA9T-2 | | 100 | | | | | | | |
| PA9T-3 | | | 100 | | | | | | |
| PA9T-4 | | | | 100 | | | | | |
| PA6M-6T | | | | | 100 | | | | |
| PA9T-5 | | | | | | 100 | | | |
| PA9T-6 | | | | | | | 100 | | |
| PA9T-7 | | | | | | | | 100 | |
| Copper Compound [Part by Weight] | | | | | | | | | |
| CuI | 0.05 | 0.05 | 0.05 | 0.05 | 0.05 | 0.05 | 0.05 | 0.05 | |
| CuCl | | | | | | | | | 0.05 |
| Alkali Metal Halide [Part by Weight] | 0.4 | 0.4 | 0.4 | 0.4 | 0.4 | 0.4 | 0.4 | 0.4 | 0.4 |
| KI | | | | | | | | | |
| Filler [Part by Weight] | | | | 30 | | | | | |
| Glass Fiber | | | | | | | | | |
| Properties of the Polyamide Composition | | | | | | | | | |
| Intrinsic Viscosity [η] [dl/g] | 1.27 | 1.14 | 0.82 | 1.22 | 0.95 | 1.05 | 0.95 | 1.15 | 1.28 |
| Number of terminal amino groups [µeq/g] | 14 | 11 | 10 | 45 | 85 | 40 | 51 | 25 | 11 |
| Number of terminal carboxyl groups [µeq/g] | 37 | 39 | 72 | 13 | 2 | 15 | 12 | 33 | 33 |
| Heat Aging Characteristic [%] | 87 | 94 | 92 | 58 | 66 | 71 | 59 | 71 | 85 |
| Deflection Temperature under load [° C.] | 144 | 143 | >270 | 143 | 112 | 144 | 120 | 139 | 143 |
| Water Absorption [%] | 0.13 | 0.14 | 0.05 | 0.18 | 0.66 | 0.15 | 0.16 | 0.16 | 0.15 |
| Dimensional Stability [%] | 0.13 | 0.08 | 0.03 | 0.09 | 0.24 | 0.08 | 0.12 | 0.10 | 0.10 |
| Hot Water Resistance [%] | 98 | 99 | 100 | 98 | 90 | 95 | 93 | 93 | 95 |
| Chemical Resistance [%] | 75 | 73 | 91 | 75 | 40 | 75 | 69 | 72 | 71 |

Example 5

PA9T-4 obtained in the Comparative Example 1 (1) was dried at 120° C. under reduced pressure for 14 hours. 100 part by weight of PA9T-4, thus dried, was dry blended with 0.8 part by weight of potassium iodide [KI], 0.1 part by weight of copper (I) iodide [CuI] and 0.5 part by weight of phthalic anhydride. The resulting blend was kneaded and extruded by a twin-screw extruder [HT-30; D=30 mm φ; L/D=32; made by Research Laboratory of Plastics Technology Co., Ltd.] under the condition of a cylinder temperature of 320° C. and a rotating speed of 40 r.p.m. to give pellets of polyamide composition. The intrinsic viscosity of the polyamide composition [η] and the number of terminal amino groups of the polyamide were determined. Results are shown on the Table 2. The obtained pellet was dried at 120° C., under vacuum for 12 hours. The dried pellet was subjected to injection molding by an injection molder [NS15; made by Nissei Jushi Kogyo Inc.] under the condition of a cylinder temperature of 330° C. and a mold temperature of 150° C. to give a molded article. The molded article obtained was tested for deflection temperature under load, water absorption, dimensional stability, hot water resistance, chemical resistance and heat aging characteristics. Results are also shown on the Table 2.

Examples 6 and 7

The procedure of the Example 5 was repeated except that 0.4 part by weight of pyromellitic dianhydride [Example 6] or 0.5 part by weight of anisic acid [Example 7] was used instead of 0.5 part by weight of phthalic anhydride to give pellets of polyamide composition. The intrinsic viscosity of the polyamide composition [η] and the number of terminal amino groups of the polyamide were determined. Results are shown on the Table 2. The pellets obtained were dried at 120° C. under vacuum for 12 hours. The dried pellets were subjected to injection molding by an injection molder (NS15; made by Nissei Jushi Kogyo Inc.] under the condition of a cylinder temperature of 330° C. and a mold temperature of 150° C. to give a molded article. The obtained molded article was tested for deflection temperature under load, water absorption, dimensional stability, hot water resistance, chemical resistance and heat aging characteristics. Results are also shown on the Table 2.

Example 8

PA9T-4 obtained in the Comparative Example 1 (1) was dried at 120° C. under reduced pressure for 14 hours. 100 part by weight of PA9T-4, thus dried, was dry blended with 0.8 part by weight of potassium iodide [KI], 0.1 part by weight of copper (I) iodide [CuI] and 0.5 part by weight of phthalic anhydride. The resulting blend was kneaded and extruded by a twin-screw extruder [BT-30; D=30 mm φ; L/D=32; made by Research Laboratory of Plastics Technology Co., Ltd.] under the condition of a cylinder temperature of 320° C. and a rotating speed of 40 r.p.m., while being fed with glass fiber [3540; made by PPG Inc.] in an amount of 30% by weight based on the weight of the PA9T-4, to give pellets of polyamide composition. The intrinsic viscosity of the polyamide composition [η] and the number of terminal amino groups of the polyamide were determined. Results are shown on the Table 2. The pellets obtained were dried at 120° C. under vacuum for 12 hours. The dried pellets were subjected to injection molding by an injection molder [NS15; made by Nissei Jushi Kogyo Inc.] under the condition of a cylinder temperature of 330° C. and a mold temperature of 150° C. to give a old article. The obtained molded article was tested for deflection temperature under load, water absorption, dimensional stability, hot water resistance, chemical resistance and heat aging characteristics. Results are also shown on the Table 2.

Example 9

PA6M-6T obtained in the Comparative Example 2 (1) was dried at 120° C., under reduced pressure for 14 hours. 100 part by weight of PA6M-6T, thus dried, was dry blended with 0.8 part by weight of potassium iodide [KI], 0.1 part by weight of copper (I) iodide [CuI] and 1 part by weight of phthalic anhydride. The resulting blend was kneaded and extruded by a twin-screw extruder [BT-30; D=30 mm φ; L/D=32; made by Research Laboratory of Plastics Technology Co. Ltd.] under the condition of a cylinder temperature of 320° C. and a rotating speed of 40 r.p.m. to give pellets of polyamide composition. The intrinsic viscosity of the polyamide composition [η] and the number of terminal amino groups of the polyamide were determined. Results are sewn on the Table 2. The pellets obtained were dried at 120° C. under vacuum for 12 hours. The dried pellet was subjected to injection molding by an injection molder [NS15: made by Nissei Jushi Kogyo Ins.] under the condition of a cylinder temperature of 330° C., and a mold temperature of 150° C. to give a molded article. The obtained molded article was tested for deflection temperature under load, water absorption, dimensional stability, hot water resistance, chemical resistance and heat aging characteristics. Results are also shown on the Table 2.

Comparative Example 6

The procedure of Example 5 was repeated except that no phthalic anhydride was used. The intrinsic viscosity of the polyamide composition [η] and the number of terminal amino groups of the polyamide were determined. Results are shown on the Table 2. The pellets obtained were dried at 120° C. under vacuum for 12 hours. The dried pellets were subjected to injection molding by an injection molder [NS15: made by Nissei Jushi Kogyo Inc.] under the condition of a cylinder temperature of 330° C. and a mold temperature of 150° C., to give a molded article. The molded article obtained was tested for deflection temperature under load, water absorption, dimensional stability, hot water resistance, chemical resistance and heat aging characteristics. Results are also shown on the Table 2.

Comparative Example 7

The procedure of the Example 9 was repeated except that no phthalic anhydride was used. The intrinsic viscosity of the polyamide composition [η] and the number of terminal amino groups of the polyamide were determined. Results are shown on the Table 2. The pellets obtained were dried at 120° C., under vacuum for 12 hours. The dried pellets were subjected to injection molding by an injection molder [NS15; made by Nissei Jushi Kogyo Inc.] under the condition of a cylinder temperature of 330° C., and a mold temperature of 150° C. to give a molded article. The molded article obtained was tested for deflection temperature under load, water absorption, dimensional stability, hot water resistance, chemical resistance and heat aging characteristics. Results are also shown on the Table 2.

TABLE 2

|  | Ex. 5 | Ex. 6 | Ex. 7 | Ex. 8 | Ex. 9 | Comp. Ex. 6 | Comp. Ex. 7 |
|---|---|---|---|---|---|---|---|
| Semiaromatic Polyamide [Part by Weight] | | | | | | | |
| PA9T-4 | 100 | 100 | 100 | 100 |  | 100 |  |
| PA6M-6T |  |  |  |  | 100 |  | 100 |
| Copper Compound [Part by Weight] | | | | | | | |
| CuI | 0.1 | 0.1 | 0.1 | 0.1 | 0.1 | 0.1 | 0.1 |
| CuCl | | | | | | | |
| Alkali Metal Halide [Part by Weight] | | | | | | | |
| KI | 0.8 | 0.8 | 0.8 | 0.8 | 0.8 | 0.8 | 0.8 |
| Organic Compound | | | | | | | |
| Species[1] | PhAn | PyAn | AA | PhAn | PhAn | None | none |
| Amount [Part by Weight] | 0.5 | 0.4 | 0.5 | 0.5 | 1.0 | | |
| Ratio by terminal amino groups [eq][2] | 2.3 | 2.4 | 1.1 | 2.3 | 1.5 | | |
| Filler [wt %][3] | | | | | | | |
| Glass Fiber |  |  |  | 30 |  |  |  |
| Properties of the Polyamide Composition | | | | | | | |
| Intrinsic Viscosity [η] [dl/g] | 1.25 | 1.23 | 1.19 | 1.28 | 1.02 | 1.23 | 0.92 |
| Number of terminal amino groups [μeq/g] | 10 | 10 | 9 | 9 | 10 | 45 | 85 |
| Heat Aging Characteristic [%] | 90 | 85 | 87 | 98 | 83 | 58 | 66 |
| Deflection Temperature under load [° C.] | 143 | 145 | 144 | >270 | 115 | 145 | 117 |
| Water Absorption [%] | 0.17 | 0.17 | 0.18 | 0.10 | 0.46 | 0.17 | 0.45 |
| Dimensional Stability [%] | 0.12 | 0.11 | 0.12 | 0.03 | 0.21 | 0.12 | 0.23 |
| Hot Water Resistance [%] | 93 | 95 | 94 | 100 | 89 | 95 | 93 |
| Chemical Resistance [%] | 72 | 74 | 69 | 90 | 35 | 75 | 78 |

Note:
[1] PhAn: Phthalic Anhydride, PyAn: Pyromellitic Dianhydride, and AA: Anisic Acid
[2] Equivalent of the organic compound based on the number of terminal amino groups, which is calculated as follows: $F \times M/[N_{NH2} \times W]$; wherein F is the number of the functional groups, which is reactive with the terminal amino group, of the organic compound; M is the amount of the organic compound [μmole]; $N_{NH2}$ is the number of terminal amino groups [μeq/g]; and W is an amount of the polyamide [g]. When the organic compound has an acid anhydride group, one acid anhydride group is calculated as two carboxyl groups.
[3] Based on the weight of the semiaromatic polyamide.

Having now fully described the invention, it will be apparent to one of the ordinary skill in the art that many changes and modifications can be made thereto without departing from the spirit or scope of the invention as set forth herein.

This application is based on Japanese Patent Application No. 2001-169159, filed on Jun. 5, 2001, the entire contents of which are hereby incorporated by reference.

What is claimed as new and is intended to be secured by Letters Patent is:

1. A polyamide composition, which comprises:
100 parts by weight of (A) a semiaromatic polyamide having dicarboxylic acid units comprising aromatic dicarboxylic acid units and diamine units comprising aliphatic diamine units having 4 to 14 carbon atoms and containing not more than 15 μeq/g of terminal amino groups; and 0.01 to 5 parts by weight of (B) a copper compound.

2. The polyamide composition of claim 1, wherein 60 to 100 mole % of said dicarboxylic acid unit is terephthalic acid unit and 60 to 100 mole % of said diamine unit is 1,9-nonanediamine unit and/or 2-methyl-1,8-octanediamine unit.

3. The polyamide composition of claim 2, wherein 70 to 100 mole % of said dicarboxylic acid unit is terephthalic acid unit and 70 to 100 mole % of said diamine unit is 1,9-nonanediamine unit and/or 2-methyl-1,8-octanediamine unit.

4. The polyamide composition of claim 1, wherein said copper compound is a copper (I) compound.

5. The polyamide composition of claim 1, which further comprises 1 to 20 part by weight of (c) an alkali metal halide based on 1 part by weight of (B) the copper compound.

6. The polyamide composition of claim 5, wherein said copper compound is copper (I) iodide and said alkali metal halide is potassium iodide.

7. The polyamide composition of claim 1, which further comprises (D) a filler in an amount of 1 to 60% by weight based on the total weight of the polyamide composition.

8. The polyamide composition of claim 1, wherein the intrinsic viscosity of the semiaromatic polyamide ranges from 0.4 to 3.0 dl/g.

9. The polyamide composition of claim 8, wherein the intrinsic viscosity of the semiaromatic polyamide ranges from 0.5 to 2.0 dl/g.

10. The polyamide composition of claim 1, wherein at least 10% of the terminal groups in the polyamide chains are blocked with a terminal-blocking agent.

11. The polyamide composition of claim 1, wherein the dicarboxylic acid of the dicarboxylic acid units is a member selected from the group consisting of terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and combinations thereof.

12. The polyamide composition of claim 1, wherein the aliphatic diamine of the aliphatic diamine units having 4 to 14 carbon atoms is a linear aliphatic alkylenediamine selected from the group consisting of 1,4-tetramethylenediamine, 1,6-hexanediamine, 1,7-heptanediamine, 1,8-octanediamine, 1,9-nonanediamine, 1,10-decanediamine, 1,11-undecanediamine and 1,12-dodecanediamine or a branched aliphatic alkylenediamine selected from the group consisting of 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, and combinations thereof.

13. The polyamide composition of claim 1, which comprises up to not more than 60% by wt of a filler selected from the group consisting of a fibrous filler, a whisker-like filler, and mixtures thereof.

14. A molded article prepared from the polyamide composition of claim 1.

15. A process for producing a polyamide composition, comprising:

melt kneading 100 parts by weight of (A') a semiaromatic polyamide having dicarboxylic acid units comprising aromatic dicarboxylic acid units and diamine units comprising aliphatic diamine units having 4 to 14 carbon atoms, 0.01 to 5 parts by weight of (B) a copper compound and (E) an organic compound which is reactive with the terminal amino groups of said semiaromatic polyamide (A') in an amount of 0.1 to 10 equivalent of the number of terminal amino groups of said semiaromatic polyamide (A').

16. The process of claim 15, wherein said organic compound (E), reactive with terminal amino groups of said semiaromatic polyamide (A'), is at least one compound selected from a group consisting of a carboxylic acid, a carboxylic anhydride, an isocyanate and an epoxy compound, and combinations thereof.

17. The process of claim 15, wherein said organic compound (E) is a monocarboxylic acid selected from the group consisting of stearic acid, cyclohexanecarboxylic acid, benzoic acid, anisic acid and combinations thereof; a dicarboxylic acid selected from the group consisting of adipic acid, azelaic acid, sebacic acid, terephthalic acid, 4,4'-oxydibenzoic acid and combinations thereof; an acid anhydride selected from the group consisting of trimellitic anhydride, 1,8-naphthalic anhydride, phthalic anhydride, maleic anhydride and combinations thereof; a dianhydride of a tetracarboxylic acid which is pyromellitic anhydride; an isocyanate which is phenyl isocyanate; a diisocyanate selected from the group consisting of 4,4'-diphenylmethane diisocyanate, tolylene diisocyanate, xylylene diisocyanate, hexamethylene diisocyanate, isophorone diisocyanate, and combinations thereof; and an epoxy compound which is a bisphenol A epoxy resin.

18. The process of claim 15, wherein the amount of the organic compound (E) ranges from 0.5 to 5 equivalents, based on the number of moles of the terminal amino groups contained in the semiaromatic polyamide (A').

19. The process of claim 18, wherein the amount of the organic compound (E) ranges from 1 to 3 equivalents, based on the number of moles of the terminal amino groups contained in the semiaromatic polyamide (A').

20. A semiaromatic polyamide having dicarboxylic acid units comprising aromatic dicarboxylic acid units and diamine units comprising aliphatic diamine units having 4 to 14 carbon atoms and comprising not more than 15 $\mu$eq/g of terminal amino groups.

* * * * *